United States Patent
Hipelius et al.

[15] 3,656,846
[45] Apr. 18, 1972

[54] SLIDE METERING MECHANISM

[72] Inventors: John W. Hipelius, Skokie; James H. Murray, Chicago, both of Ill.

[73] Assignee: Bell & Howell Company, Chicago, Ill.

[22] Filed: Dec. 30, 1969

[21] Appl. No.: 889,213

[52] U.S. Cl.............................353/104, 40/78.07, 353/112
[51] Int. Cl...................................G03b 23/00, G03b 23/02
[58] Field of Search............353/103, 104, 111, 112, 113, 353/114, 118; 33/177; 40/78.07, 78.03, 78.09; 221/117, 304

[56] References Cited

UNITED STATES PATENTS

| | | | |
|---|---|---|---|
| 1,136,295 | 4/1915 | Szilard | 33/177 |
| 3,419,982 | 1/1969 | Heisler | 353/113 |
| 3,485,558 | 12/1969 | Michniewicz | 353/112 |

*Primary Examiner*—Leonard Forman
*Assistant Examiner*—Steven L. Stephan
*Attorney*—William F. Pinsak, John E. Peele, Jr., Kenneth W. Greb and William K. Serp

[57] ABSTRACT

This invention presents a mechanism for metering a single slide from a supply into a slide transport disc that moves the slide through operative stations in a projector. The metering mechanism is operative during both forward and reverse rotations of the slide transport disc.

3 Claims, 3 Drawing Figures

PATENTED APR 18 1972

Inventors:
John W. Hipelius,
James H. Murray.

By William F. Pinck Atty

Inventors:
John W. Hipelius,
James H. Murray.

By William F. Pinske Atty

SLIDE METERING MECHANISM

This application is related to co-pending U.S. Pat. application, Ser. Nos. 735,730; 860,856; 860,858; 860,384; 860,385; 860,336; 860,857.

The inventions disclosed in the above-identified co-pending applications pertain to a novel photographic slide projector. The slide projector accepts slides from a vertical stack, the slides being disposed in a horizontal plane. The slides are then transported in a horizontal plane about a vertical rotational axis through various operative stations of the slide projector.

As is well known to those of ordinary skill in the art a slide projector must contain a mechanism that permits only a single slide to be projected at one time. Otherwise, the machine may jam or two slides will be projected at the same time resulting in a double image.

Furthermore, different slide mountings have different thicknesses. Consequently it is highly desirable to construct a metering mechanism that will permit a single slide access to the projection area regardless of its thickness, within practical limitations. Because of the slide thicknesses being used by the major manufacturers, a slide metering device must be readily adjustable to rather precise tolerances.

This invention presents a slide metering mechanism useful in the projector described in the above-identified co-pending applications that is effective in metering a single slide from a supply. The metering device is easy to adjust, thereby simplifying installation in the projector, and permitting adjustment to the necessary tolerances. The metering device operates in both forward and reverse directions of travel, allowing a slide that has been projected to be reprojected by reversing the operational directional of the machine.

The features of this invention will be apparent from the description of the accompanying drawings in which like numerals refer to like parts.

Figure 1:
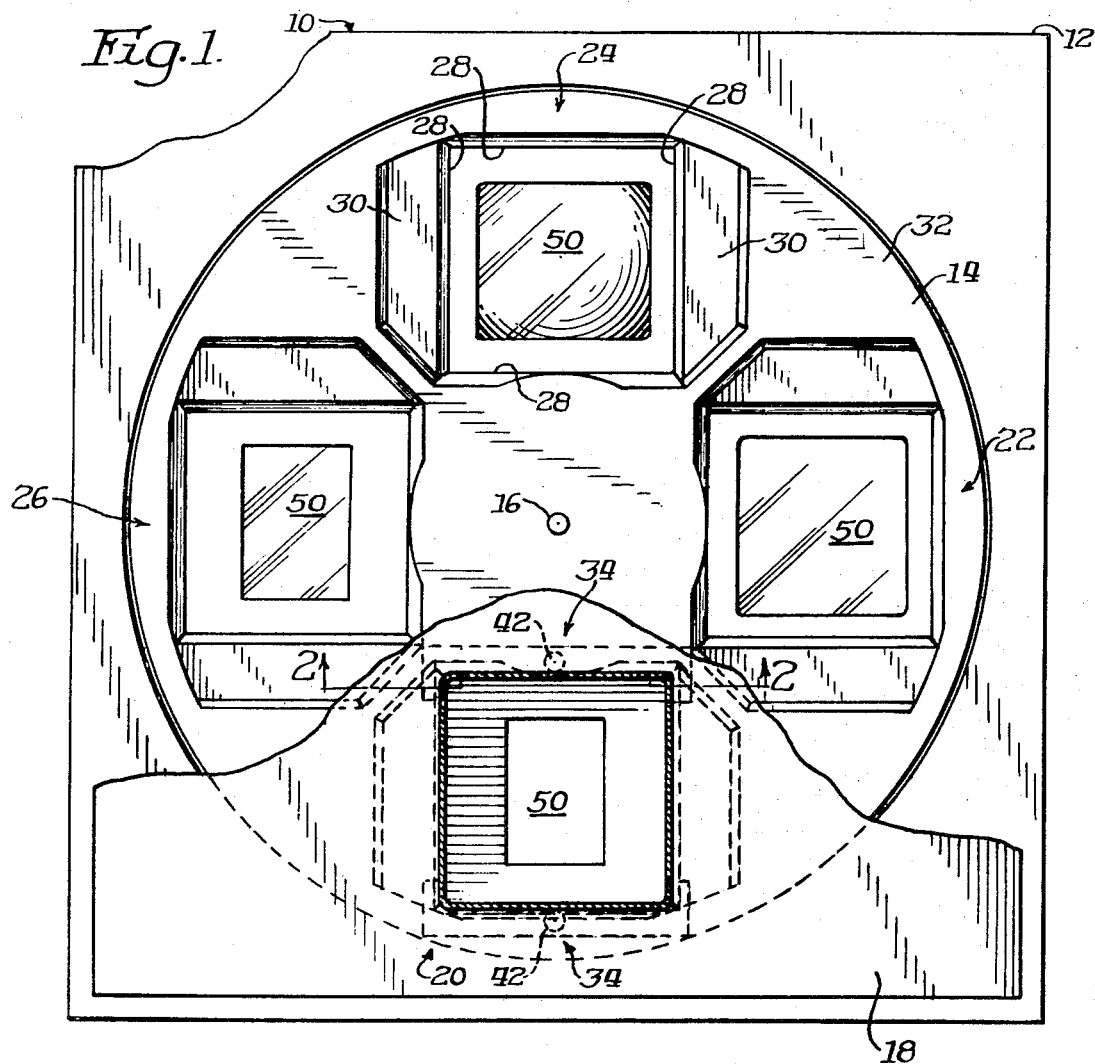
FIG. 1 is a plane view of a slide transport system with a metering mechanism constructed in accordance with the principles of this invention.

Referring now to the drawings a projector indicated generally by the reference numeral 10 has been depicted in FIG. 1. A complete description of the projector 10 may be found in co-pending application, Ser. No. 860,384; however, herein only the transport system will be discussed in detail.

A transport disc 14 is rotatably mounted with respect to a lower housing 12 about an axis entering the paper at 16. Four substantially square apertures 50 within the transport disc 14 expose the operative stations 20, 22, 24 and 26 of the slide projector. A slide is normally sequenced from an input station 20, to a previewing station 22, to a projection station 24, to a post projection station 26, and finally to be deposited in a collecting chamber (not shown) underlying the input station 20. As indicated in the related co-pending applications, the normal cycle may be reversed such that a slide at the post projection station 26 may be returned for reprojection at the projection station 24. An upper housing 18 overlies the transport disc 14 and the lower housing 12.

The slide carrying apertures 50 within the transport disc 14 are defined by beveled edges 28. Two of the beveled edges 28 lead to a recessed lower surface 30, and then to an upper surface 32.

Figure 3:
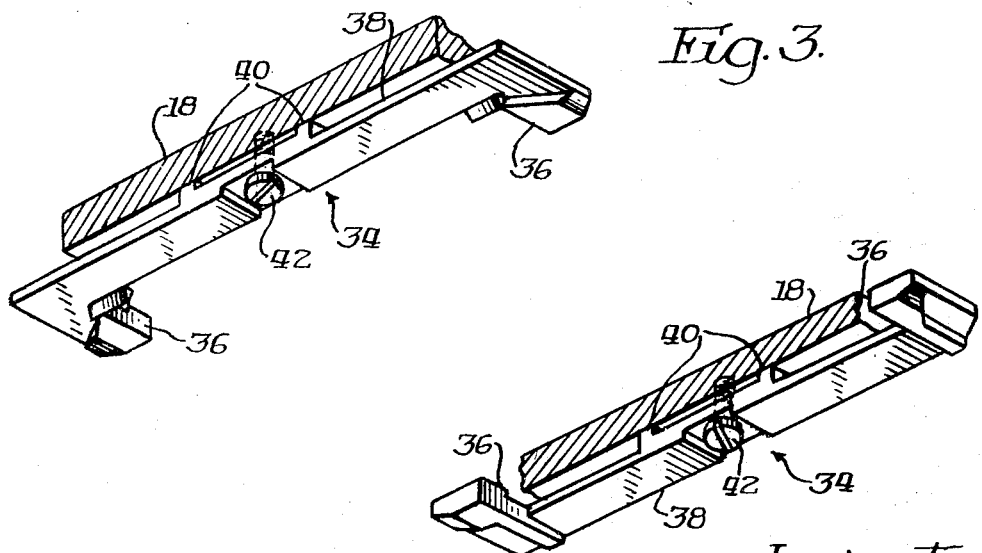
FIG. 3 is a perspective view of the metering mechanism constructed in accordance with the principles of this invention.

Two components indicated generally at 34, and shown in phantom in FIG. 1, form a metering mechanism constructed in accordance with the principles of this invention. Referring now to FIG. 3, it may be seen that each component 34 includes two stop surfaces 36 extending transversely from a flexible supporting arm 38. The supporting arm 38 is attached to the undersurface of the upper housing 18 by a screw 42.

Two projections 40, 40 extend upwardly from the supporting arm 38 and contact the undersurface of the upper housing 18. The projections 40, 40 are substantially equally spaced from the screw 42 and act as fulcrums about which the stop surfaces 36, 36 pivot when a force is applied by the screw 42. By changing the torque applied to the screw 42, the pressure exerted by the stop surfaces on the disc in the areas adjacent to the start of the passage may be altered. This provides a simple mechanism for adjusting the metering mechanism.

Figure 2:
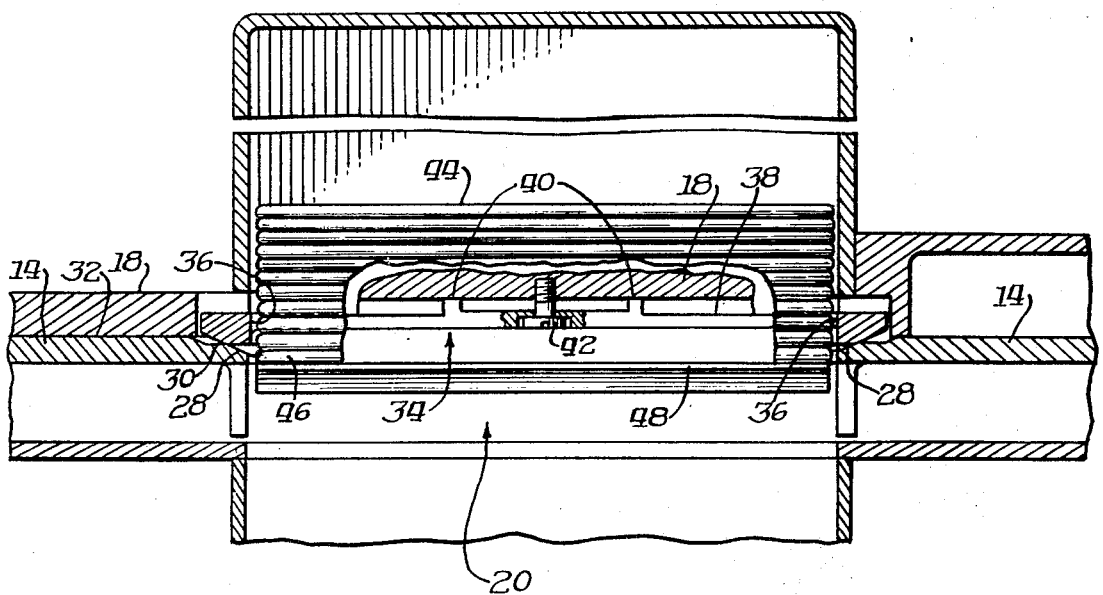
FIG. 2 is a cross-sectional view taken along line 2—2 in FIG. 1, looking in the direction of the arrows. A supply of slides has been included and the Figure is partly broken away.

Referring now to FIG. 2, it may be seen that a supply of slides 44 has been positioned over the input station 20. One component 34 of the metering mechanism is visible and of course includes the stop surfaces 36, 36. A lowermost slide 46 has been received within the aperture defined by beveled edges 28. The slide 46 rests on a retaining surface 48 that is more fully described in co-pending application Ser. No. 860,384.

As seen in FIG. 2, the lowermost edge of the stop surface 36 rests on the recessed portion 30 of the drive plate 14. That position is selected such that the lowermost edge of the stop surface 36 interferes with the slide next adjacent to slide 46. Consequently, movement of the transport disc 14 in either a rightwardly or leftwardly direction, will permit only the lowermost slide 46 to be transported by the transport disc 14. The distance between the lowermost edge of the stop surfaces 36, and the retaining surface 48 must be chosen so that it is less than twice the thickness of the thinnest slide which is to be used in the projector. Transport plate 14 is selected of a thickness approximately equal to the thickness of a "thin" slide.

Thus an improved slide metering mechanism has been described. The metering mechanism is bi-directional and extremely convenient to assemble and adjust. It finds particular applicability in a slide projector that transports slides in a horizontal plane.

It should be understood, of course, that the foregoing disclosure relates only to a preferred embodiment of the invention, and that many modifications or alterations may be made without departing from the spirit and scope of the invention as set forth in the appended claims.

What is claimed is:

1. In a slide projector having an input station formed in a housing for receiving a stack of slides and means for transporting slides from said stack in either of two opposite directions, a metering assembly for insuring that only a single slide at a time is transported from said input station which comprises:

a flexible arm mounted on the underside of said housing that includes two stop surfaces disposed on said arm, said arm being flexible in the direction of stacking to allow adjustment of said stop surfaces;

said stop surfaces being disposed at opposing edges of a slide in said stack such that one of said surfaces restrains movement of the slide adjacent the bottom slide in said stack when said transport means transports said bottom slide in a first direction and the other of said stop surfaces restrains movement of the slide adjacent the bottom slide in said stack when said transport means transports said bottom slide in the opposite direction.

2. The metering assembly set forth in claim 1 wherein said stop surfaces are disposed at opposite ends of said arm; a pair of fulcrums project from said arm and are contiguous with the underside of said housing; and said arm is mounted to said housing at the mid-point of said arm by an adjustable fastening means for adjusting the disposition of said stop surfaces.

3. In a slide projector having an input station comprising means formed in a housing for receiving a stack of horizontally oriented slides and retaining surfaces underlying said housing for supporting said stack, and having a rotatable disc including apertures for receiving the bottom slide in said stack and transporting said bottom slide in either of opposite directions from said input station, the metering assembly comprising:

a flexible elongated arm having a stop surface disposed on each end and a pair of upwardly protruding fulcrums that are equispaced from the mid-point of said arm, said arm being mounted to the underside of said housing by an adjustable fastening means at the mid-point of said arm such that said fulcrums are contiguous with said underside of said housing and the distance between the lowest edge of said stop surfaces and said retaining surfaces is less than twice the thickness of the thinnest slide in said stack whereby one of said stop-surfaces prevents movement of the slide adjacent the bottom slide when said bottom slide is transported in one of said directions and the other of said stop-surfaces prevents movement of the slide adjacent the bottom slide when said bottom slide is moved in the other of said directions.

\* \* \* \* \*